United States Patent [19]
Yost

[11] 3,831,486

[45] Aug. 27, 1974

[54] ELECTROMAGNETICALLY OPERATED LATCH

[75] Inventor: Betty Jane Yost, Dayton, Ohio

[73] Assignee: Ledex, Inc., Dayton, Ohio

[22] Filed: Dec. 11, 1972

[21] Appl. No.: 313,939

[52] U.S. Cl.......... 89/1.5 D, 24/230 A, 24/230 AV, 294/83
[51] Int. Cl........................ A44b 11/25, F41f 5/06
[58] Field of Search...... 24/230 A, 230 AV; 294/83; 89/1.5 D

[56] References Cited
UNITED STATES PATENTS

| | | | |
|---|---|---|---|
| 1,190,383 | 7/1916 | Court | 24/230 A |
| 1,493,479 | 5/1924 | Deatrick | 24/230 AV |
| 2,896,288 | 7/1959 | Davis | 24/230 A |
| 2,922,340 | 1/1960 | Wilkie | 89/1.5 D |
| 3,285,132 | 11/1966 | McCurdy | 89/1.5 D |

FOREIGN PATENTS OR APPLICATIONS

| | | | |
|---|---|---|---|
| 303,259 | 9/1920 | Germany | 294/83 R |

*Primary Examiner*—Bernard A. Gelak
*Attorney, Agent, or Firm*—Dybvig & Dybvig

[57] ABSTRACT

A latch device is assembled upon a one-piece body member having an electromagnet core portion at one end thereof and a platform extending from the core portion to the other end thereof. The one-piece body includes parallel stanchions rising above said platform to support a shaft pivotally mounting a lever which cooperates with a knob on said platform to provide a latch mechanism. The stanchions also support a plate spring biasing said lever against said knob to yieldingly close said latch mechanism. An electromagnet assembled about said core portion acts, when energized, to drive one end of a second shaft into a chamber between said lever and said platform to positively lock said latch mechanism.

5 Claims, 5 Drawing Figures

PATENTED AUG 27 1974 3,831,486
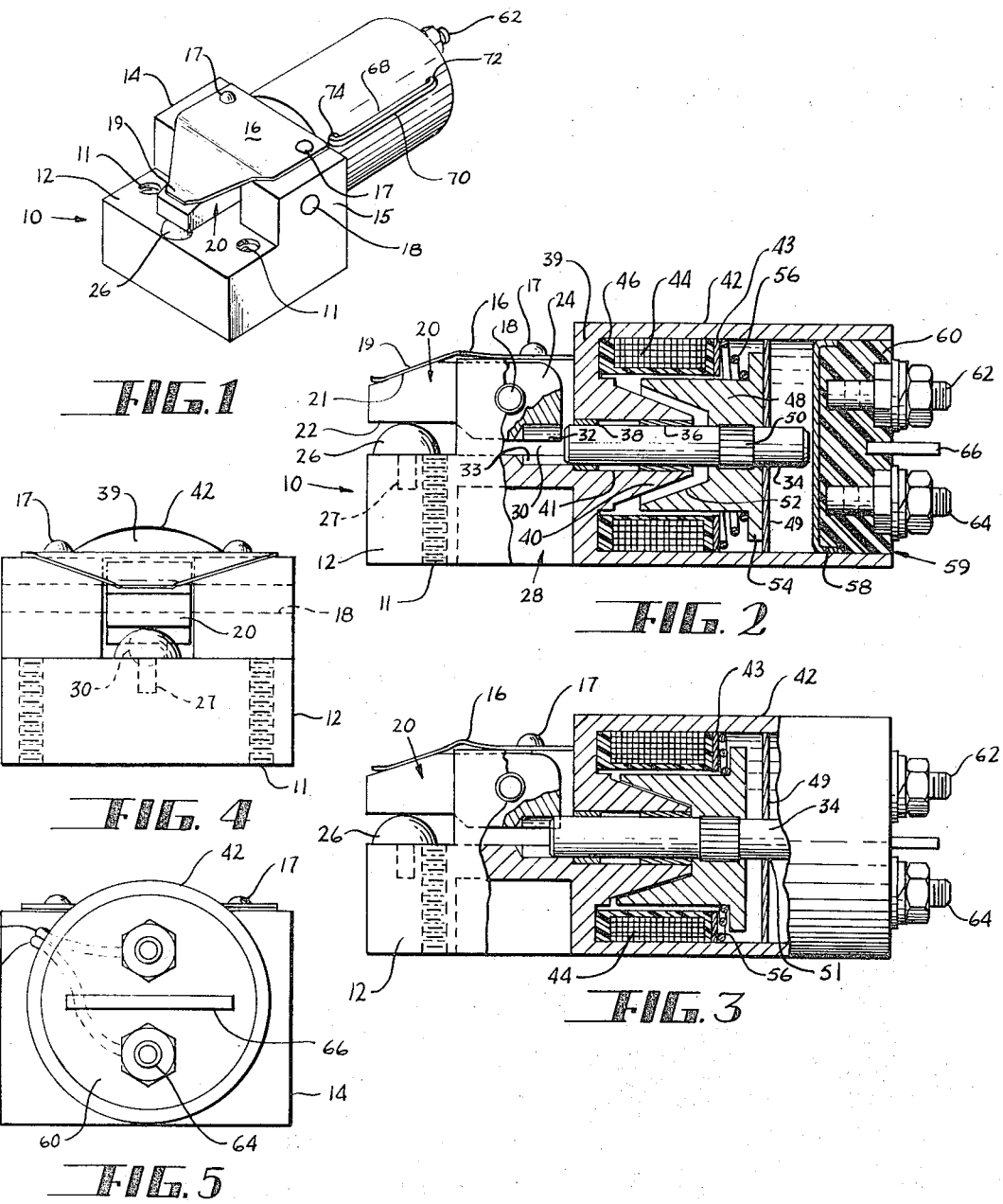

ELECTROMAGNETICALLY OPERATED LATCH

BACKGROUND OF THE INVENTION

1. Field of the Invention

This invention relates to a latch device for selectively retaining or releasing a ring element such as employed for arming a bomb dropped from an aircraft and, more particularly, to such a device manufactured with a fewer number of parts while yet having a structural strength and reliability enhanced over that of the prior art. 2. Description of the Prior Art It is a common practice to equip bombs with an arming cable that must be yanked away from the bomb before the bomb will have an explosive capability. Typically, the arming cable is equipped with a loop or ring which can be seized within an aircraft such that as the bomb falls from the aircraft, the weight of the bomb yanks the cable being held by the aircraft so as to arm the bomb as it falls.

It is known in the prior art to releasably hold the ring of the arming cable by means of a latch mechanism having a knob sized to enter the ring and having a lever yieldably biased against the knob for holding the ring about the knob. Such devices frequently employ an arming solenoid which is selectively energizable to block the movement of the lever, thus to positively retain the arming ring. If the solenoid is not energized when a bomb is dropped, the arming ring slips away from the latch mechanism and the bomb falls harmlessly. On the other hand, if the solenoid is energized, the arming ring is retained in the aircraft as the bomb falls, thus yanking the arming cable away from the bomb so as to arm the bomb as it falls. Solenoid operated latch mechanisms of the foregoing type appear in U.S. Pat. No. 3,285,132 and No. 2,922,340.

Since the latch mechanism must be carried by the aircraft, the weight of the mechanism together with its arming solenoid is an important factor. Thus, there has been a tendency to reduce the size of the parts associated with the latch mechanism and with the solenoid so as to reduce the weight of the mechanism; but, in the past, undersized parts have led to failures of the latch mechanisms to perform their intended functions.

An object of the present invention is to provide a new and improved latch device.

Another object of the present invention is to provide a latch device suitable for retaining the ring of a bomb-arming cable, said device being of a simplified, but nevertheless structurally enhanced, construction.

Other objects and advantages reside in the construction of parts, the combination thereof, the method of manufacture and the mode of operation, as will become more apparent from the following description.

SUMMARY OF THE INVENTION

In the present invention, a one-piece body member is designed to serve, on the one hand, as a core and casing for an arming solenoid and, on the other hand, as a support for a latch mechanism to grip an arming ring. This construction assures proper alignment between the latch mechanism and the arming solenoid, thus assuring a more reliable operation. The one-piece construction also substantially reduces manufacturing costs by reducing the number of pieces that must be assembled while, at the same time, relieving the tolerances with which such pieces must be produced.

BRIEF DESCRIPTION OF THE DRAWING

FIG. 1 is a perspective view of a device embodying the present invention.

FIG. 2 is a side elevational view of the device, with portions broken away to illustrate interior construction, the device being illustrated with its solenoid de-energized.

FIG. 3 is a side elevational view of the device, with portions broken away to illustrate internal construction, the device being illustrated with its solenoid energized.

FIG. 4 is a front elevation view of the device.

FIG. 5 is a rear elevation view of the device.

DESCRIPTION OF THE PREFERRED EMBODIMENT

The device illustrated in the drawing is assembled upon a one-piece ferromagnetic body 10. The body 10 includes a platform 12 which may have internally threaded bores 11 for convenient mounting to a bomb rack in an aircraft. The platform 12 may also have a cavity 28 in its underside to reduce its weight.

The body 10 includes spaced-apart stanchions 14 and 15 which project upwardly from the platform 12. The body 10 also includes a generally circular wall 39 integrally affixed to the stanchions 14 and 15 and a cylindrical sleeve 42 projecting from the wall 39 outwardly from the stanchions 14 and 15.

The body 10 also includes a frustum conical core portion 40 projecting from the wall 39 into the interior of the aforementioned cylindrical sleeve 42. As will be more fully explained in a later portion of this specification, the wall 39, sleeve 42 and core portion 40 provide a magnetic flux path for an electromagnet. Accordingly, the one-piece body 10 is a relatively soft iron or steel having a good permeability to magnetic flux.

The body 10 supports a latch assembly which includes a lever 20 and a knob 26. The knob 26 has a depending shank 27 press-fitted into a suitable aperture (not shown) in the platform 12. While the knob 26 might have been formed as an integral part of the platform 12, it is preferred to be a separate part press-fitted to the platform 12 so that this part may be a hardened steel capable of greater wear.

The lever 20 is pivotally supported between the stanchions 14 and 15 by means of a shaft 18 journaled in suitably located bores through the stanchions 14 and 15. The lever 20 and its shaft 18 may again be hardened steel parts so as to minimize wear.

The lever 20 has an end portion 22 overlying the knob 26. For convenience, the end portion 22, being remote from the wall 39, can be referred to as the distal end of the lever. Likewise, the opposite end portion 24 may be referred to as the proximal end of the lever. In like fashion, the platform 12 can be said to have a distal end supporting the knob 26 and a proximal end abutting the wall 39.

The distal end of the lever 20 is biased against the knob 26 by means of a plate spring 16 mounted on top of the stanchions 14 and 15 by suitable fasteners 17. The plate spring 16 thus has a downwardly sloped tongue 19 which wipes a sloping end surface 21 on the lever 20. The bias of the plate spring 16 against the lever 20 is sufficient to hold the lever against the knob 26 without chatter during the normal flight conditions of an aircraft. The proximal end of the lever is thus held at a normally fixed position above the platform 12.

As appears in FIGS. 2 and 3, the core portion 40 has a central bore 41. Coaxial with the bore 41, but of a smaller diameter, is a second bore or chamber 30 entering the confronting portions of the proximal end of the lever 20 and the proximal end of the platform 12. In consequence of this second bore, the platform 12 has an arcuate groove 32 confronting an arcuate groove 33 in the lever 20. It is to be noted, of course, that the chamber 30 remains of constant size only so long as the plate spring 16 holds the lever 20 against the knob 26. Should a sufficient lifting force be exerted upon the distal end of the lever 20, the lever will be pivoted about the shaft 18, thus diminishing the size of the chamber 30. In the absence of such a lifting force, however, the bias of the plate spring 16 holds the chamber 30 to a constant size; this size being just sufficient to snugly receive one end of a shaft 34.

The shaft 34 is supported concentrically in the bore 41 by means of suitably located bearings 36 and 38. Seized to the shaft 34 by means of knurling 50 is a ferromagnetic armature 48 having a frustum conical recess 52 conforming in size and shape to the core portion 40.

The sleeve 42 is sized to receive a solenoid coil 44 mounted in encircling relation to the core portion 40. The coil 44 is supported in a non-conductive bobbin 46 which also encircles the core portion 40. The bobbin 46 is confined adjacent the wall 39 by a ferromagnetic ring 43 press-fitted into the sleeve 42. A coiled spring 56 confined between the ring 43 and an annular flange 54 formed on the armature 48 biases the armature 48 away from the core portion 40, the outward movement of the armature 48 being limited by a preferably non-magnetic disc 49 press-fitted into the sleeve 42. The disc 49 has a central aperture 51 which cooperates with the bearings 36 and 38 to support the shaft 34 concentrically within the sleeve 42.

Those skilled in the art will recognize that the wall 39, core portion 40, sleeve 42 and ring 43 provide a flux path about the coil 44; this path being partially completed by the armature 48, together with its annular flange 54. Upon energization of the coil 44, the armature 48 will seek to more completely close this flux path and will, therefore, move axially toward the core portion 40 against the bias of the spring 56.

Press-fitted into the sleeve 42 and spaced outwardly from the disc 49 is a cup member 58. The cup member 58 cooperates with the outer end of the sleeve 42 to form a chamber 59 which is filled with an electrically insulating potting compound 60 such as an epoxy cement. Embedded in the compound 60 are threaded terminals 62 and 64. Wires 68 and 70 connect from the terminals 62 and 64, where the wires are embedded in the compound 60, outwardly through an aperture 72 in the sleeve 42, then axially along the outer wall of the sleeve 42. The wires then pass radially through an aperture 74 in the sleeve 42 to the coil 44. A suitable source of power applied to the terminals 62 and 64 may thus be used to energize the coil 44. To prevent short-circuiting between the terminals 62 and 64, a suitable insulating barricade 66 may also be embedded in the potting compound 60.

It will be noted that the separation between the cup member 58 and the disc 49 allows the shaft 34 to reciprocate axially without leaving the support of the disc 49 and without contacting the cup member 58.

As will be apparent from the foregoing description, an energization of the coil 44 with power effective to attract the armature 48 will advance the shaft 34 from an initial position outside the chamber 30, as appears in FIG. 2, to a final position inside the chamber 30 as appears in FIG. 3. The shaft 34 is sized to snugly enter the chamber 30 with the result that when the coil 44 has been energized, the lever 20 will be immobilized and unable to pivot away from the knob 26. When the coil 44 is de-energized, the spring 56 retracts the shaft 34 from the chamber 30 and a force sufficient to overcome the bias of the spring 16 is all that is required to pivot the lever 20 away from the knob 26.

In the ordinary operation of the device shown in the drawings, a metallic ring associated with a bomb-arming cable (not shown) is thrust between the knob 26 and the lever 20 with a force sufficient to lift the lever 20 and allow the ring to reach a position encircling the knob 26. The knob 26 is symmetrically rounded at its upper surface and, accordingly, the ring is ordinarily retractable from the latching device with the same force required for its insertion. However, when the coil 44 has been energized and, accordingly, the shaft 34 advanced into the chamber 30, the ring will be positively trapped in its position encircling the knob 26.

Although the preferred embodiment of the invention has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In an electromagnetically controlled latch device of the type comprising a lever co-acting with a knob to entrap an element looped about the knob, a one-piece ferromagnetic body having a platform supporting said knob, said body having spaced-apart stanchions projecting upwardly from said platform, means engaged to said stanchions pivotally supporting said lever between said stanchions, spring means affixed to said stanchions to bias one end of said lever against said knob, the opposite end of said lever confronting said platform and cooperating with said platform to define a chamber therebetween, said one-piece body having a solenoid core adjacent said platform, said core having a bore axially aligned with said chamber, a shaft disposed in said bore, said shaft having an end portion sized to interfit said chamber, a ferromagnetic armature affixed to said shaft, and a solenoid coil encircling said core, the construction and arrangement being such that upon energization of said solenoid coil said armature approaches said core and, in so doing, advances said one end portion of said shaft into said chamber to block said lever against separation from said knob.

2. The device of claim 1 wherein said platform and said opposite end of said lever having confronting arcuate grooves each extending axially parallel to the axis of said shaft, said confronting grooves comprising walls of said chamber and imparting to said chamber a generally cylindrical shape.

3. The device of claim 2 wherein said generally cylindrical chamber is generally coaxial with said bore, the diameter of said bore exceeding the diameter of said chamber, said device including bearing means interposed in said bore between said shaft and said core to guide said end portion of said shaft into said chamber.

4. The device of claim 3 wherein said one-piece body includes a sleeve coaxial with said bore and encircling said core, said coil interposed between said sleeve and said core, said armature disposed in said sleeve, and including second spring means co-acting between said body and said armature to bias said armature and the shaft affixed thereto outwardly of said chamber.

5. In an electromagnetically controlled latch device of the type comprising a lever co-acting with a knob to entrap an element looped about the knob, support means having a platform supporting said knob, said support means having a stanchion projecting upwardly from said platform, means engaged to said stanchion to pivotally support said lever above said platform, one end of said lever overlying said knob, spring means coupled to said support means to bias said one end of said lever against said knob, the opposite end of said lever having a portion spaced from and confronting a portion of said platform, said confronting portions of said lever and said platform being semi-circular defining a generally cylindrical chamber in the space between said opposite end of said lever and said platform, said support means having a ferromagnetic solenoid core adjacent said platform, said core having a bore axially aligned with said chamber, a shaft in said bore, said shaft having an end portion shaped cylindrically to interfit said chamber and contact said confronting portions of said lever and said platform in said chamber, a ferromagnetic armature coupled to said shaft, and a solenoid coil encircling said core, the construction and arrangement being such that upon energization of said solenoid coil said armature approaches said core and in so doing interposes said one end of said shaft in said chamber to block said lever against separation from said knob.

* * * * *